(12) United States Patent
Menkhoff et al.

(10) Patent No.: US 6,522,272 B2
(45) Date of Patent: Feb. 18, 2003

(54) ANALOGUE FRONTEND

(75) Inventors: Andreas Menkhoff, München (DE); Peter Schöllhorn, Holzkirchen (DE)

(73) Assignee: Infineon Technologies, AG, Munich (DE)

( * ) Notice: Subject to any disclaimer, the term of this patent is extended or adjusted under 35 U.S.C. 154(b) by 0 days.

(21) Appl. No.: 09/780,936

(22) Filed: Feb. 9, 2001

(65) Prior Publication Data

US 2001/0030620 A1 Oct. 18, 2001

(30) Foreign Application Priority Data

Feb. 9, 2000 (DE) ......................................... 100 05 605

(51) Int. Cl.[7] .............................................. H03M 1/84
(52) U.S. Cl. ...................................... 341/139; 341/155
(58) Field of Search .............................. 341/139, 155, 341/141, 122, 124, 118, 131, 136, 159

(56) References Cited

U.S. PATENT DOCUMENTS

| | | | | |
|---|---|---|---|---|
| 4,875,045 A | * | 10/1989 | Lynch et al. | ................ 341/139 |
| 5,093,660 A | | 3/1992 | Beauducel | |
| 5,365,233 A | | 11/1994 | Schaub | |
| 5,422,643 A | * | 6/1995 | Chu et al. | .................... 341/141 |
| 6,285,305 B1 | * | 9/2001 | Feld et al. | ................... 341/139 |
| 6,317,070 B1 | * | 11/2001 | Yuan | .......................... 341/155 |
| 6,333,707 B1 | * | 12/2001 | Oberhammer et al. | ....... 341/155 |

FOREIGN PATENT DOCUMENTS

| | | |
|---|---|---|
| DE | 690 11 998 T2 | 6/1990 |
| DE | 43 02 057 | 1/1993 |

* cited by examiner

*Primary Examiner*—Peguy JeanPierre
*Assistant Examiner*—Joseph Lauture
(74) *Attorney, Agent, or Firm*—Peter F. Corless; Christine C. O'Day; Edwards & Angell, LLP

(57) ABSTRACT

An analogue frontend, such as is used, for example, in receivers for communications equipment, comprises a plurality of analogue components (1–3) which are connected upstream of an analogue/digital converter (4). In order to control the drive level of the individual analogue components (1–3) precisely, the input of the analogue/digital converter (4) can optionally be connected via a switch-over device (8) to the output of any one of the analogue components (1–3) and a drive level control signal for the respective analogue component (1–3) can be generated by a digital control device (5) by evaluating the sampled value which is then supplied by the analogue/digital converter (4).

12 Claims, 1 Drawing Sheet

ANALOGUE FRONTEND

Figure 1:
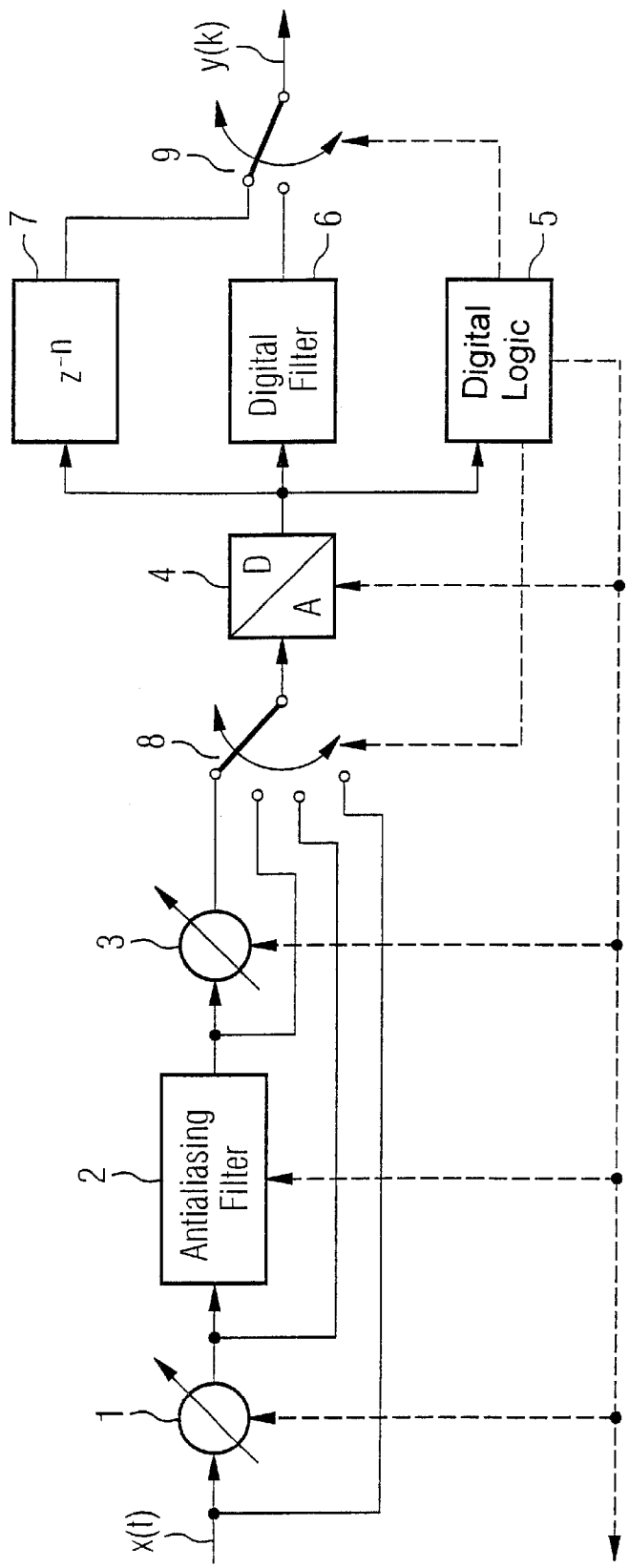

The present invention relates to an analogue frontend according to the preamble of claim 1.

Analogue frontends such as are used, for example, in telecommunications receivers comprise various analogue components which are arranged upstream of an analogue/digital converter. The analogue components, which may be, for example, amplifiers or filters, are supplied with an analogue reception signal which is processed by the analogue components before it is fed to the analogue/digital converter for sampling and digitization.

Precise drive level control of the analogue frontend is already very important and will become even more important in the future for the following reasons.

As the structural widths of integrated circuits become smaller and smaller the clock frequencies which are used on these integrated circuits continue to rise. This has the consequence that the analogue components are increasingly subjected to interference from the digital components located on the respective integrated circuit and the integrated circuits arranged in the direct vicinity. It can therefore be expected that the interference effects caused by noise will become more and more pronounced. In contrast, the supply voltage to the analogue components will decrease as the structural widths become smaller so that the distance between the increasing noise element and the decreasing supply voltage will be reduced. The decreasing structural widths cause the digital components to become smaller and smaller. Because the analogue components cannot be reduced in size in the same way, their significance is increasing. For this reason, it is important to control the drive level of the analogue components in an optimum way in order to keep the implementation losses as low as possible.

Hitherto, so-called peak detectors have been used to control the drive level of the analogue components which are not located directly upstream of the analogue/digital converter. Whenever the analogue signal exceeds a specific threshold, this transgression is perceived by the peak detectors. If the number of peaks detected by the peak detectors within a specified time interval exceeds a specific limiting value, the drive level of the analogue components is reduced. If, on the other hand, an excessively low number of peaks is detected by the peak detectors, the drive level of the analogue components is increased.

However, controlling the drive level of the analogue frontend and/or of the corresponding analogue components using peak detectors entails a number of problems.

Firstly, the region between the largely linear behaviour of the analogue frontend and the signal distortion caused by the amplitude limiting is fluid. That is to say there are regions in which the analogue signal is not distorted at all upstream of the analogue components, distorted little, greatly distorted or very severely distorted. However, with the previously described peak detectors just one of these thresholds can be interrogated or monitored. However, this threshold would have to be changed as a function of the amplitude histogram of the analogue input signal in order to be able to control the drive level of the analogue frontend in an optimum way. However, when digital television signals are received with satellite support, the amplitude histogram of a pure QPSK ("Quadrature Phase Shift Keying") signal, for example, differs to a relatively large extent from that of an SCPC ("Single Carrier Per Channel") signal.

As has been described above, the peak detectors register the transgression of a predefined signal amplitude in a region in which the analogue signal of the analogue frontend is distorted to a greater or lesser degree. Of course, this transgression may take place only very rarely so that the overall distortion of the analogue signal is sufficiently small. The peak detectors should, with respect to the clock of the analogue/digital converter, be triggered once to approximately the order of magnitude of each 10,000-th sampled value, so that in each case a drive level control of the analogue components is carried out after every 10,000 sampled values. However, this means that the measuring periods become very long and the variance of the measurement is relatively high.

The invention is therefore based on the object of proposing an analogue frontend in which a more precise drive level control of the analogue components, in particular of the analogue components which are not located directly upstream of the analogue/digital converter can be carried out with only a small degree of additional expenditure.

This object is achieved according to the invention by means of an analogue frontend having the features of claim 1. The subclaims describe respective preferred and advantageous embodiments of the present invention.

In the solution according to the invention the fact is exploited that the analogue frontend which is usually embodied in the form of an integrated circuit, already has with the analogue/digital converter a very precise measuring instrument for determining amplitudes. The analogue/digital converter can optionally be connected downstream of each stage, i.e. downstream of each analogue component, of the analogue frontend in order to measure the analogue signal level at the different switched positions of the analogue signal level. The output signal of the analogue/digital converter is subsequently evaluated in order to generate a drive level control signal for the respective analogue component.

Every sampled value of the analogue/digital converter can be used for this purpose in the phase of level readjustment of the analogue frontend because in this phase the content of the received analogue signal is not of interest so that the analogue frontend, and thus the analogue received signal, can be set quickly and precisely. On the other hand, in the phase of ongoing operation, the content of the received signal is of primary interest. Nevertheless, the signal levels of the analogue frontend must be monitored because the reception conditions can change at any time—for example as a result of adjacent channels in the respective receiver being switched on or off. For this reason, during ongoing operation, preferably only every k-th sampled value of the analogue/digital converter is used to check the drive level control of the analogue frontend at different switching points. The sampled value which is not available for the digital output signal owing to this measure can be determined by interpolation from adjacent sampled values of the analogue/digital converter.

The analogue frontend according to the invention can thus be used to control the drive level of each individual analogue component reliably and precisely. It is possible to determine a histogram etc. of the analogue input signal at each point on the analogue frontend in order to be able to ensure a corresponding drive level control of the analogue components which can change the level or the amplitude response of the analogue input signal. It is not necessary to use peak detectors. If control is not carried out with respect to the peak values but rather, for example, with respect to the variance of the input signal, the control or drive level control can react more quickly because now every k-th sampled value, instead of every 10,000-th sampled value, contains the amplitude information which is necessary for drive level control.

The invention is suitable in principle for precise drive level control of any analogue frontend of any design. However, the present invention is suitable in particular for analogue frontends such are used in receivers for telecommunications applications, for example cable modems.

The invention will be explained below in more detail by means of a preferred exemplary embodiment with reference to the appended drawing.

Here, the single FIGURE shows the structure of an analogue frontend according to the invention in the form of a block circuit diagram.

The analogue frontend receives an analogue signal x(t) which is fed to a signal processing path with a plurality of analogue components. In the illustrated exemplary embodiment, the analogue input signal x(t) passes through, in this signal processing path, an amplifier 1, an antialiasing filter 2 and a further amplifier 3 before it is fed via a change-over switch 8 to an analogue/digital converter 4 for sampling and digitization.

The analogue/digital converter 4 can be connected via the change-over switch 8 to any element of this signal processing path. In particular, the analogue/digital converter 4 can be connected, using the change-over switch 8, downstream of any individual analogue component 1–3 of the analogue frontend, which changes the level or the amplitude response of the analogue input signal. Connected to the output of the analogue/digital converter 4 is a digital logic circuit 5 which evaluates the sampled values supplied by the analogue/digital converter in order to generate, as a function thereof, drive level control signals for the individual analogue components 1–3.

In the phase of level readjustment of the analogue frontend, the content of the analogue received signal x(t) is not of interest. During this phase, the digital logic circuit 5 can therefore use any sampled value of the analogue/digital converter 4 to generate a drive level control signal. For this purpose, the change-over switch 8 is alternately switched by the digital logic circuit 5 into the different positions illustrated so that the level of the analogue received signal x(t) is measured at the different switched positions of the analogue frontend by the analogue/digital converter 4, and the sampled values supplied by the analogue/digital converter 4 are evaluated by the digital logic circuit 5 in order to generate corresponding drive level control signals.

In contrast, in the phase of ongoing operation, the content of the analogue received signal x(t) is of primary interest. However, so that the drive level of the individual analogue components 1–3 of the analogue frontend can also be controlled during this phase, only the k-th sampled value of the analogue/digital converter 4 is evaluated during this phase in order to check the drive level control of the analogue frontend at different switched positions. The switched position which is respectively required for the check is connected to the input of the analogue/digital converter 4 by means of the digital logic circuit 5, in turn via the change-over switch 8.

However, during this procedure the problem occurs that the sampled value of the analogue/digital converter 4 which is used for drive level control is not available for the digital output signal y(k). The sampled value which is thus not available for the digital output signal y(k) can, however, be calculated by interpolation from the adjacent sampled values. For this purpose, a digital filter 6, which carries out the interpolation described above, is coupled to the output of the analogue/digital converter 4. Furthermore, a digital delay circuit 7 of the order n, which equalizes the group delay time of the digital filter 6, is coupled to the output of the analogue/digital converter 4. The output of the digital filter 6 and of the delay circuit 7 are connected via a further switch 9 to the output of the analogue frontend. The switch 9 is driven by the digital logic circuit 5 in such a way that in normal operation the output of the analogue frontend is connected to the output of the analogue/digital converter 4 via the digital delay circuit 7, while in drive level control mode the output of the analogue frontend is connected to the output of the analogue/digital converter 4 via the digital filter 6 in order to output an interpolated sampled value for the digital output signal y(k). The digital output signal y(k) can thus be tapped continuously at the output of the analogue frontend.

The digital filter 6 can have, for example with a digital delay circuit 7 which has the transmission function $z^{-4}$, the transmission function:

$$H(z)=-1+9*z^{-1}-24*z^{-2}+40*z^{-3}+40*z^{-4}-24*z^{-5}+9*z^{-6}+9*z^{-7}-z^{-8}.$$

What is claimed is:

1. Analogue frontend, having:
a plurality of analogue components to which an analogue input signal is fed,
an analogue/digital converter, connected downstream of the analogue components, for converting the analogue input signal processed by the analogue components into a digital output signal,
a control device for controlling the drive level of each of the analogue components, and
a switch-over device for selectively connecting the input of the analogue/digital converter to the output of a respective one of the analogue components,
the control device being configured in such a way that it generates a control signal for the switch-over device in order to connect the input of the analogue/digital converter to the output of a respective one of the analogue components and, by evaluating the digital output signal of the analogue/digital converter, generates a drive level control signal for that respective analogue component whose output is connected to the input of the analogue/digital converter via the switch-over device.

2. Analogue frontend according to claim 1, characterized in that the control device is configured in such a way that during a level readjustment phase of the analogue frontend it evaluates each sampled value of the digital output signal of the analogue/digital converter in order to generate the drive level control signal for that analogue component whose output is connected to the input of the analogue/digital converter.

3. Analogue frontend according to claim 1, characterized in that the control device being configured in such a way that during the normal operation of the analogue frontend it evaluates each k-th sampled value of the digital output signal of the analogue/digital converter, where k is an integer, in order to generate the drive signal for that analogue component whose output is connected to the input of the analogue/digital converter.

4. Analogue frontend according to claim 3, characterized in that the output of the analogue/digital converter is coupled to a digital interpolation device for determining the k-th sampled value of the digital output signal, said sampled value corresponding to the analogue input signal, by interpolation of sampled values, adjacent to the k-th sampled value, of the digital output signal.

5. Analogue frontend according to claim 4, characterized in that the interpolation device is embodied in the form of a digital filter.

6. Analogue frontend, having:

a plurality of analogue components to which an analogue input signal is fed, an analogue/digital converter, connected downstream of the analogue components, for converting the analogue input signal processed by the analogue components into a digital output signal, a control device for controlling the drive level of the analogue components, and a switch-over device for connecting the input of the analogue/digital converter optionally to the output of one of the analogue components, the control device being configured in such a way that it generates a control signal for the switch-over device in order to connect the input of the analogue/digital converter to the output of one of the analogue components and, by evaluating the digital output signal of the analogue/digital converter, generates a drive level control signal for that analogue component whose output is connected to the input of the analogue/digital converter via the switch-over device; the control device being configured in such a way that during the normal operation of the analogue frontend it evaluates each k-th sampled value of the digital output signal of the analogue/digital converter, where k is an integer, in order to generate the drive signal for that analogue component whose output is connected to the input of the analogue/digital converter; and a further switch-over device is provided for switching over between the digital output signal of the analogue/digital converter and the digital output signal of the digital interpolation device, the control device being configured in such a way that during normal operation of the analogue frontend it switches over the further switch-over device for each k-th sampled value of the analogue/digital converter to the output of the digital interpolation device, and for the other sampled values of the analogue/digital converter to the output of the analogue/digital converter, it being possible to tap the digital output signal corresponding to the analogue input signal at the output of the further switch-over device.

7. Analogue frontend according to claim 6, characterized in that an input terminal of the further switch-over device is connected to the output of the digital interpolation device, while another input terminal of the further switch-over device is connected to the output of the analogue/digital converter via a digital delay circuit, the digital delay circuit being provided for equalizing the group delay time of the digital interpolation device.

8. Analogue frontend according to claim 1, characterized in that the control device is configured in the form of a digital logic circuit.

9. Analogue frontend according to claim 1, characterized in that the analogue components which can be activated by the drive level control signals of the control device are such that they change the level.

10. Analogue frontend according to claim 9, characterized in that the analogue components comprises at least one amplifier whose drive level can be controlled.

11. Analogue frontend according to claim 1, characterized in that the analog components which can be activated by the drive level control signals of the control device are such that they change the amplitude response of the analogue input signal.

12. Analogue frontend according to claim 11, characterized in that the analogue components comprises at least one analogue filter.

\* \* \* \* \*